United States Patent [19]

Stockton

[11] Patent Number: 4,541,523

[45] Date of Patent: Sep. 17, 1985

[54] CONVEYOR BELT SCRAPER

[76] Inventor: Neville R. T. Stockton, 47 Judy St., Modelpark, Witbank, Transvaal, South Africa

[21] Appl. No.: 520,413

[22] Filed: Aug. 4, 1983

[51] Int. Cl.⁴ .............................................. B65G 45/00

[52] U.S. Cl. .................................................... 198/499

[58] Field of Search ............... 198/499, 497; 15/256.5, 15/256.51, 256.53

[56] References Cited

U.S. PATENT DOCUMENTS

| | | | |
|---|---|---|---|
| 3,598,231 | 8/1971 | Matson | 198/499 |
| 3,952,863 | 4/1976 | Schattauer | 198/499 |
| 4,036,354 | 7/1977 | Reiter | 198/499 |
| 4,105,109 | 8/1978 | Schultz | 198/499 |
| 4,249,650 | 2/1981 | Stahura | 198/499 |

FOREIGN PATENT DOCUMENTS

| | | | |
|---|---|---|---|
| 58-2111 | 1/1983 | Japan | 198/499 |

*Primary Examiner*—Joseph E. Valenza
*Assistant Examiner*—Kyle E. Shane
*Attorney, Agent, or Firm*—Barnes & Thornburg

[57] ABSTRACT

This invention relates to a conveyor scraper assembly which includes a track arrangement which is adapted for location beneath a conveyor belt, a carriage which is adapted for engagement with and sliding movement on the track arrangement, means for locking the carriage to the track a plurality of aligned scraper blade assemblies and springs resiliently connecting the blade assemblies to the carriage.

8 Claims, 6 Drawing Figures

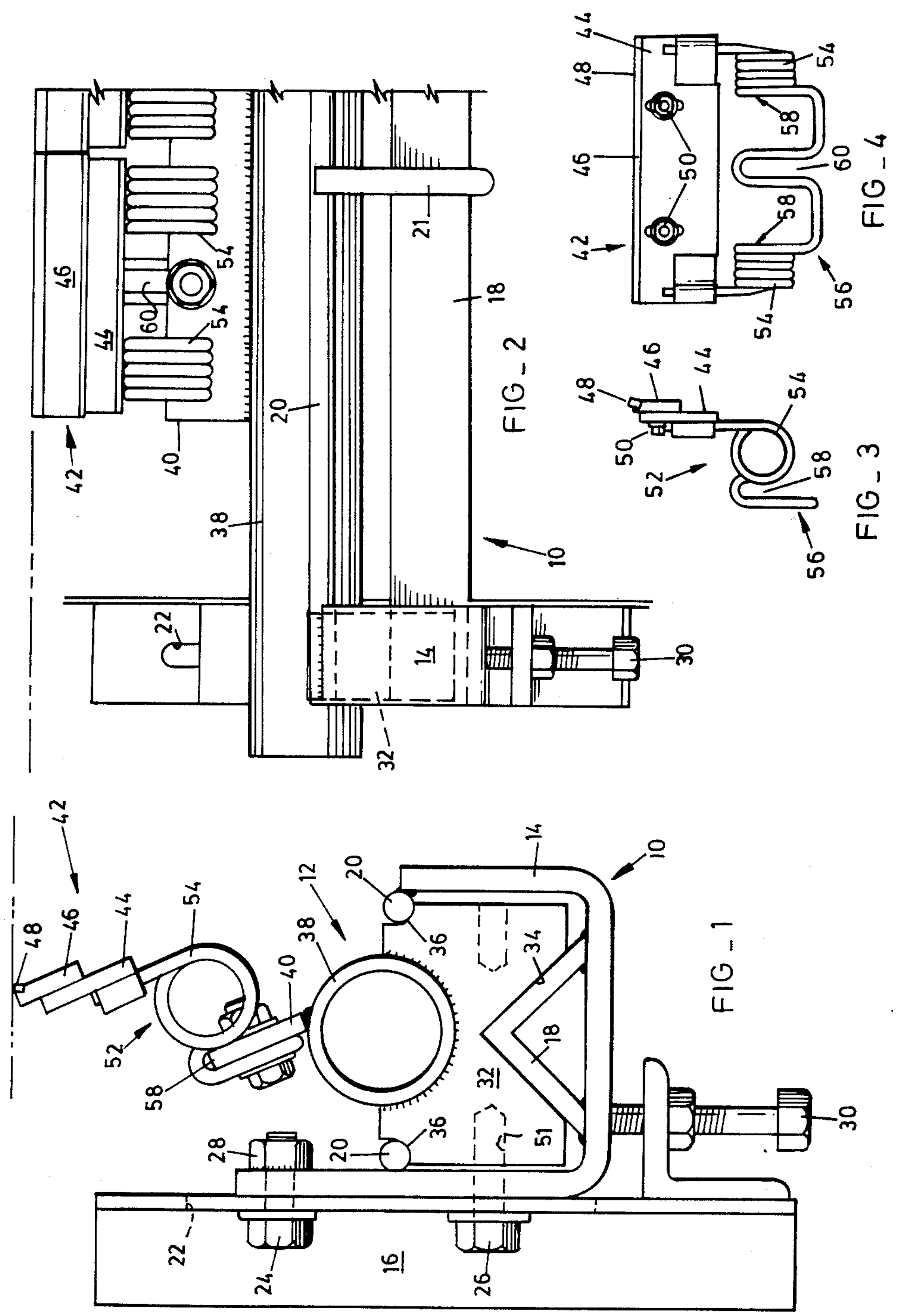
FIG_1
FIG_2
FIG_3
FIG_4

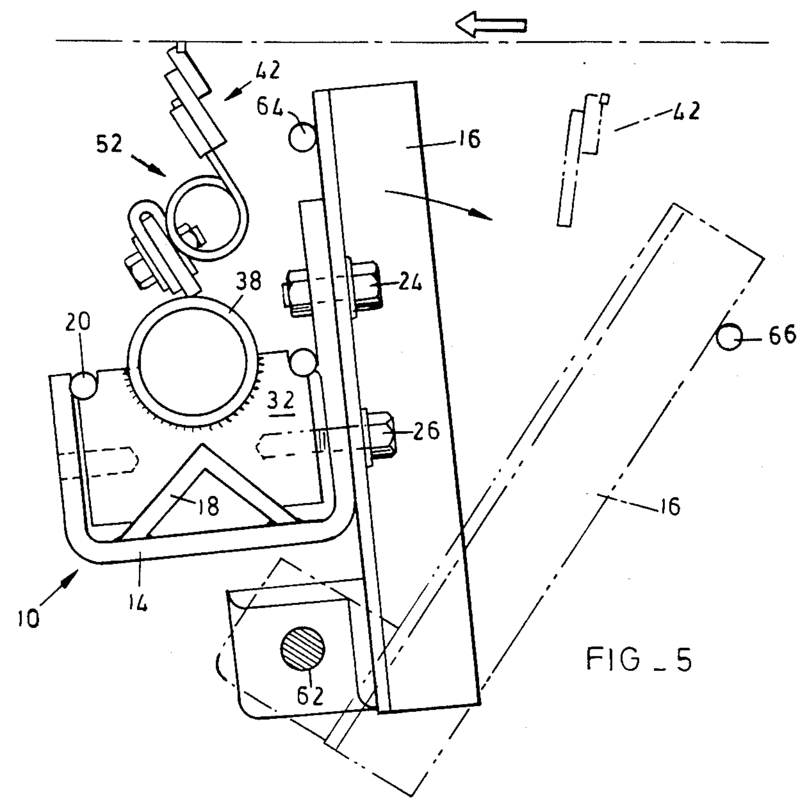
FIG_5
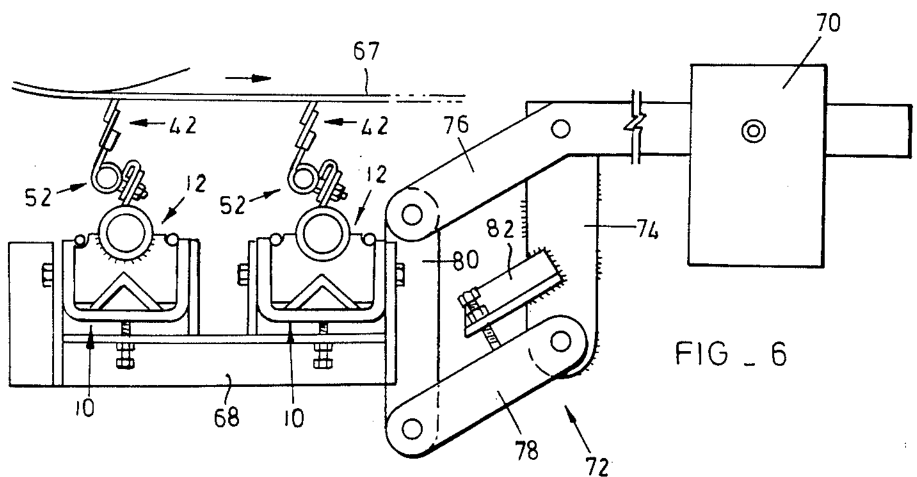
FIG_6

CONVEYOR BELT SCRAPER

FIELD OF THE INVENTION

This invention relates to a conveyor belt scraper assembly and a blade for use with the assembly.

BACKGROUND TO THE INVENTION

Conveyor belt scrapers for removing slurry from the underside of the belts are well known. A first difficulty with the known scrapers is that the scrapers are attached to structure which fixes them beneath the belt making the replacement of damaged or worn blades difficult, if not impossible, while the conveyor is in operation. A second difficulty with the scrapers is that if the width of the blades are, when measured from the underside of the belt, sufficiently wide, the mass of accumulated slurry against the blades could cause the belt to override the blades and, if the blades should be resiliently mounted, force the blades out of contact with the underside of the belt.

OBJECT OF THE INVENTION

It is the object of this invention to provide a conveyor scraper assembly and blades for use with the assembly which will at least minimise the above problems.

SUMMARY OF THE INVENTION

A conveyor scraper assembly according to the invention includes a track arrangement which is adapted for location beneath a conveyor belt, a carriage which is adapted for engagement with and sliding movement on the track arrangement, means for locking the carriage to the track arrangement, a plurality of aligned scraper blade assemblies and springs connecting the blade assemblies to the carriage so that the blades on the assemblies are biased onto the underside of the belt against the direction of belt travel in use.

In one form of the invention the track is attached to fixed structure on either side of the belt in a direction normal to the direction of belt travel.

In another form of the invention the assembly is attached to structure which is mounted on pivots which lie on an axis beneath the belt which is normal to the direction of belt travel so that the scraper assembly and its blades may be rotated out of engagement with the underside of the belt. Conveniently the assembly is rotatable on its pivot axis between a first stop in which the blades on the blade assemblies are in pressure contact with the underside of the belt and a second stop which is remote from the first in a direction against the direction of belt travel.

In yet a further form of the invention the assembly includes a frame member to which the scraper assembly is attached, an arm, an adjustable weight on the arm and a parallel linkage connecting the frame member to the weight arm so that the blades of the scraper blade assemblies are always biased by the weight onto the belt in a direction normal to the belt surface. The frame member may carry two or more parallel conveyor scraper assemblies.

In a preferred form of the invention the springs which connect the scraper blade assemblies to the carriage are metal coil spring arrangements. Each spring arrangement may consist of a continuous element which is formed into at least two spaced and axially aligned coils with the elements between the coils being bent into one or more loops by means of which the arrangement may releasably be fastened to the carriage with the free ends of the elements extending in a common plane from the coils and being secured to the scraper blade assemblies. Preferably, the scraper blade assemblies are held spaced from and parallel to a strip on the carriage.

BRIEF DESCRIPTION OF THE DRAWINGS

The invention is now described by way of example with reference to the drawings in which:

FIG. 1 is a side elevation of the conveyor scraper assembly of the invention, FIG. 2 is an end elevation, on a reduced scale, of the assembly of FIG. 1 when seen from the right of FIG. 1, FIG. 3 is an end elevation of the scraper blade assembly which is used on the conveyor scraper assembly of FIGS. 1 and 2, FIG. 4 is a side elevation of the assembly of FIG. 3, FIG. 5 is a side elevation of the FIG. 1 conveyor scraper assembly shown mounted on a pivot arrangement, and FIG. 6 is a side elevation of two of the FIG. 1 conveyor scraper assemblies on an alternate mounting arrangement.

DETAILED DESCRIPTION OF THE DRAWINGS

The FIGS. 1 and 2 embodiment of the conveyor scraper assembly of the invention is shown in the drawings to consist of a track arrangement 10 and a carriage 12. The track arrangement 10 consists of two substantially U-shaped brackets 14 which are fixed to uprights 16 on either side of the conveyor belt path, an angle bar 18 which bridges and is attached to the base of the brackets and two rod rails 20 which bridge and are attached to the brackets as illustrated in the drawings. The rails 20 are supported at intervals by U-shaped rod brackets 21 which are welded to both the rails and the bar 18. The brackets 14 are bolted through vertical slots 22 to the uprights by bolts 24 and 26. The bolt 24 engages in a nut 28 which is welded to the bracket. An adjustable stop bolt 30 on the upright 16 is used to provide fine pressure adjustment of the scraper blades on the belt by upward movement of the bracket.

The carriage 12 consists of two end pieces 32 which each carry and inverted V-shaped recess 34 which is complemental to the shape of the bar 18 and two curved recess formations 36 which are dimensioned and positioned on the end pieces to be guided by the underside of the rails 20. The end pieces 32 are joined by a tube 38 which is welded to grooves in the upper surface of the end pieces. The tube 48 carries a strip bracket 40 which is welded to its upper surface at an angle as illustrated in FIG. 1.

The strip 40 carries a plurality of scraper blade assemblies 42. Each scraper blade assembly, as is more clearly seen in FIGS. 3 and 4, consist of a flat plate 44, a blade carrier 46 which includes a hard metal blade 48 and bolts 50 which connect the blade carrier to the plate 44 through elongate slots by means of which the carrier may be adjusted vertically relatively to the plate 44. The width of the scraper blade assembly from the tip of the blade to the bottom of the plate 44 is about 30 mm. A coil spring arrangement 52 connects the scraper blade assembly 42 to the strip 40 on the conveyor scraper assembly. The spring consists of a single element which is formed to provide two axially aligned coils 54 with the free ends of the element being connected by any suitable means to the plates 44 and a bridge 56 between the coils which is folded to include two U-shaped formations 58 which are dimensioned to embrace the strip 40, as shown in FIG. 1, and a centrally positioned fastening loop 60 by means of which the spring is bolted to the strip 40. The elongated configuration of the loop 60 is to enable the assembly to be adjusted over its fastening bolt towards and away from the conveyor belt in use. For greater stability, the bridge 56 may include two fastening loops 60 for anchoring the spring and scraper blade assembly to the strip 40.

In use, with the bolt 30 removed or lowered from the position shown in FIGS. 1 and 2 one end of the carriage is located on the bar 18. The carriage is then slid along the track with the rails 20 engaged in the recesses 36 until the end pieces 32 are aligned with the uprights 16. The bolts 24 are then passed through the slots 22 and lightly pulled up against the uprights. The bolts 26 are likewise passed through the slots 22 and engaged in threaded bores 51 in the end pieces to locate the carriage in position under the conveyor belt. The bolts 30 are then screwed upwardly until the blades 48 bear with the desire pressure on the underside of the belt. The bolts 24, 26 and 30 are then locked in position. The springs 52 allow the blade assemblies to deflect individually under pressure from material which has adhered to the underside of the belt.

Sticky slurry which has adhered to the underside of the belt is scraped from the belt in the conventional manner by the blade assemblies 42. The relative narrowness of the blade assembly of the invention does not, however, allow the scraped slurry to accumulate on the assembly to the extent that the assemblies are deflected rearwardly from the position shown in FIG. 1 as the scraped material will move down on the assemblies only as far as the lower edge of the plate 44 from which position it will break away under gravity to pass through the carriage or, under velocity between the blade assemblies and the strip 40 between the spring coils 54.

To replace damaged or worn blades on the assembly, the bolts 30 are retracted and the bolts 24 and 26 released so that the entire scraper assembly may be pulled downwardly in the slots in the uprights to clear the blades from the undersides of the belt. The bolts 26 are then removed and the carriage is slid along the bar 18 to clear the track 10. The bolts 50 on the blade assemblies which hold the damaged or worn blades are removed to free the blade carriers from the plates 44 and fresh assemblies are bolted onto the plates in their place. The carriage 12 is then re-located on the track 10 as described above. In FIG. 5 like reference numbers denote like components. The difference between the two arrangements is, however, that the uprights 16 in this embodiment are pivotable about pivot pins 62 which are located on fixed structure beneath the conveyor belt. Also fixed to this structure are two stops 64 and 66 for limiting the pivotal movement of the assembly below the belt.

As seen from the drawing, the stop 64 is so positioned that the entire assembly is held over centre and in position by the belt when the belt is moving in the direction of the arrow in the drawing.

If the belt travel direction is reverse, the belt will pull the entire assembly over into the dotted line position in which the blades are clear of the belt to prevent the blades from causing damage to the belt. As the assembly is moved either by the reversed belt or any other suitable means to the dotted line position the blades 48 will deflect backwardly against the resilience of the springs 52 and so minimise pressure on the belt by the moving blades. The assembly is moved from the dotted line position back to the solid line position either by hand or suitably positioned pneumatic or hydraulic jacks. In this embodiment of the invention the carriage 12 is upwardly movable by a bolt identical to the bolt 30 in the previous embodiment. The bolt has, however, not been shown in this embodiment for clarity of illustration.

In the FIG. 6 scraper arrangement, as with that of FIG. 5, like reference numbers denote like components. In this embodiment two scraper assemblies are located on a frame member 68. The scraper arrangement further includes a counter-weight 70 and a parallel linkage indicated generally at 72 through which the weight 70 is connected to the frame 68.

The linkage 72 includes a bracket 74 which is fixed to structure, not shown, below the belt 67, a first cranked arm 76 which is pivotally connected to the upper end of the bracket 74, a second arm 78 which is pivotally connected to the lower end of the bracket 74 and an arm 80 to which the frame member 68 is fixed. The counter-weight is slidably located on the free end of the arm 76 and includes means, such as a grub screw, for locking it to the arm in a pre-selected position independence on the required blade pressure on the belt 67. A stop arrangement 82 is fixed to the arm 74 for limiting the vertical movement of the frame 68 and so the blades of the blade assemblies 42 relatively to the belt 67.

The FIG. 6 assembly includes a linkage arrangement 72 on opposite sides of the belt 68.

In use the counter-weight 70 biases the blades of the blade assemblies 42 into contact with the underside of the belt 68 with the linkages 72 ensuring that the blades 48 on the blade assemblies 42 are always presented normally to the underside of the belt so that the wear angle of the blades remain constant. As with the previous embodiments of the invention the springs 52 impart independent movability to the blades in the assemblies 42 which becomes necessary when the blades are unevenly placed under load by material on the underside of the belt.

To remove or replace blade assemblies on the conveyor scraper assemblies the counter-weight and arm 76 are rotated in an anti-clockwise direction about the pivot to drop the scraper assemblies from the under side of the belt from which position the blades are simply removed as described above.

The invention is not limited to the precise details as herein described and the interengaging components of both the track and carriage of the conveyor scraper assembly of the invention could have any suitable cross-sectional configuration which will enable the carriage to be slidable on and retained by the track arrangement. Additionally, the counter-weight on the FIG. 6 embodiment could be for example be replaced by any suitable biasing means such as tension adjustable springs for biasing the arms 76 in a clockwise direction.

I claim:

1. A conveyor scraper assembly including a track arrangement which is adapted for location beneath a conveyor belt, a carriage which is adapted for engagement with and sliding movement on the track arrangement, means for locking the carriage to the track arrangement, a plurality of aligned scraper blade assemblies and at least one coil spring arrangement connecting the blade assemblies to the carriage so that the blades on the assemblies are biased onto the underside of the belt against the direction of belt travel in use, each coil spring arrangement including a continuous element which is formed into at least two spaced and axially aligned coils with the portion of the element between the coils being bent into one or more loops by means of which the arrangement may releasably be fastened to the carriage with the free ends of the element extending in a common plane from the coils and being secured to the scraper blade assemblies.

2. An assembly as claimed in claim 1 in which the track is attached to fixed structure on either side of the belt in a direction normal to the direction of belt travel.

3. An assembly as claimed in claim 1 in which the assembly is attached to structure which is mounted on pivots which lie on an axis which is normal to the direction of belt travel beneath the belt so that the scraper assembly and its blades may be rotated on the pivots out of engagement with the underside of the belt.

4. An assembly as claimed in claim 3 in which the assembly is rotatable on its pivot axis between a first stop in which the blades on the blade assemblies are in pressure contact with the underside of the belt and a second stop which is remote from the first in a direction against the direction of belt travel.

5. An assembly as claimed in claim 1 including a frame member to which at least one scraper assembly is attached, an arm, an adjustable weight on the arm and a parallel linkage which is attached to fixed structure adjacent the conveyor belt connecting the frame member to the weight arm so that the blades of the scraper blade assemblies are always biased through the parallel linkage by the weight onto the belt in a direction normal to the belt surface.

6. An assembly as claimed in claim 1 in which the carriage carries an upwardly directed rigid strip which is fixed to the carriage over at least that portion of its length which is to carry the scraper blade assemblies and the spring element between the coils is looped adjacent each coil to engage over the free edge of the strip with the coils and scraper blade assemblies on one side of the strip and the or each spring fastening loop on the other side of the strip.

7. A conveyor scraper assembly as in claim 1 wherein each scraper blade assembly includes a flat metal plate, a blade carrier formed to include an insert-receiving slot, and a hard metal scraper blade insert positioned in the insert-receiving slot.

8. An assembly as claimed in claim 7 in which the width of the scraper blade assemblies from the scraping edge of the insert to the base of the plate is between 15 and 40 mm.

* * * * *